(12) United States Patent  
Dawes et al.

(10) Patent No.: US 8,904,828 B2
(45) Date of Patent: Dec. 9, 2014

(54) METHODS FOR FORMING CLADDING PORTIONS OF OPTICAL FIBER PREFORM ASSEMBLIES

(75) Inventors: Steven Bruce Dawes, Corning, NY (US); Lisa A. Hogue, Corning, NY (US); Douglas H. Jennings, Corning, NY (US); Zhiqiang Shi, Painted Post, NY (US); Christopher Scott Thomas, Horseheads, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 716 days.

(21) Appl. No.: 12/603,960

(22) Filed: Oct. 22, 2009

(65) Prior Publication Data

US 2010/0107700 A1 May 6, 2010

Related U.S. Application Data

(60) Provisional application No. 61/109,697, filed on Oct. 30, 2008.

(51) Int. Cl.
*C03B 37/012* (2006.01)
(52) U.S. Cl.
CPC ................................ *C03B 37/01282* (2013.01)
USPC .............................. 65/427; 65/17.3; 264/1.24
(58) Field of Classification Search
CPC ..................... C03B 37/01282; C03B 37/01228
USPC .................................................. 65/404, 427
See application file for complete search history.

(56) References Cited

U.S. PATENT DOCUMENTS

| 4,110,084 | A | * | 8/1978 | Lee et al. | 51/307 |
| 4,273,178 | A | * | 6/1981 | Goloff | 164/457 |
| 4,501,601 | A | | 2/1985 | Haupt | 65/2 |
| 4,626,382 | A | * | 12/1986 | Stritzke et al. | 588/11 |
| 4,867,774 | A | | 9/1989 | Dorn | 65/3.14 |
| 4,961,767 | A | * | 10/1990 | Schermerhorn et al. | 65/427 |
| 5,049,175 | A | | 9/1991 | Ross et al. | 65/3.11 |

(Continued)

FOREIGN PATENT DOCUMENTS

| JP | 61291432 A | * 12/1986 | |
| JP | 04-325430 | 11/1992 | C03B 37/012 |
| JP | 05-345631 | 12/1993 | C03B 37/012 |
| JP | 06-056447 | 3/1994 | C03B 20/00 |

OTHER PUBLICATIONS

Dorn, Reimund et al., "0.27-dB/km Attenuation Achieved by MSP Preform Process," Journal of Lightwave Technology, vol. 9, No. 6, Jun. 1991, pp. 709-714.

(Continued)

*Primary Examiner* — Joseph S Del Sole
*Assistant Examiner* — Erin Snelting
(74) *Attorney, Agent, or Firm* — Robert L Carlson (57) ABSTRACT

A method of forming a cladding portion of an optical fiber preform assembly includes positioning a glass core cane in a mold cavity and loading the mold cavity with silica glass soot. The silica glass soot is compressed in an axial direction as the vibratory energy is applied to the mold body to form a soot compact around the glass core cane, wherein the soot compact is the cladding portion of an optical fiber preform assembly and the glass core cane is a core portion of the optical fiber preform assembly.

23 Claims, 8 Drawing Sheets

(56) References Cited

U.S. PATENT DOCUMENTS

| | | | |
|---|---|---|---|
| 5,185,020 A | 2/1993 | Satoh et al. | 65/3.11 |
| 5,244,485 A | 9/1993 | Hihara et al. | 65/3.11 |
| 5,318,432 A | 6/1994 | Yagi et al. | 425/466 |
| 5,352,259 A | 10/1994 | Oku et al. | 65/412 |
| 6,542,680 B2 * | 4/2003 | Koumura et al. | 385/123 |
| 2009/0230593 A1 * | 9/2009 | Satoji et al. | 264/443 |

OTHER PUBLICATIONS

Khasanov, O., et al., "Dry Powder Compaction under Ultrasonic Action to Shape Nanostructured Bulk Materials," Euromat-Congress, Prague, Sep. 5-8, 2005.

Yoshida, Kazuaki, et al., "Fabrication of large preforms for low-loss single-mode optical fibers by a hybridized process," Glastech Berichte Glass Sci. Techno, 69, 1996, No. 12, pp. 412-416.

* cited by examiner

METHODS FOR FORMING CLADDING PORTIONS OF OPTICAL FIBER PREFORM ASSEMBLIES

CROSS-REFERENCE TO RELATED APPLICATIONS

This application claims the benefit of, and priority to U.S. Provisional Patent Application No. 61/109,697 filed on Oct. 30, 2008 entitled, "Methods for Forming Cladding Portions of Optical Fiber Preform Assemblies", the content of which is relied upon and incorporated herein by reference in its entirety.

BACKGROUND OF THE INVENTION

1. Field of the Invention

The present invention relates generally to methods for forming optical fiber preforms, and particularly to methods for forming cladding portions of optical fiber preform assemblies by axially pressing silica glass soot around a glass core cane.

2. Technical Background

The cladding portion of an optical fiber preform may be formed from an outside vapor deposition (OVD) process in which silica glass is deposited on a glass core cane, for example, through the pyrolysis of octamethyltetrasiloxane. The OVD process is a highly optimized, high yield manufacturing process. However, the formation of the cladding layer is often the rate limiting step in maximizing optical fiber output. Further, it is estimated that as little as 50% of the pyrolysis product of the octamethyltetrasiloxane feedstock is deposited on the glass core canes during deposition of the cladding portion of the optical fiber preform. The remaining pyrolysis product of the octamethyltetrasiloxane feedstock is collected in a baghouse as relatively high purity silica glass soot.

In order to further improve optical fiber output and reduce raw material costs, alternative methods of faulting the cladding portions of optical fiber preforms are needed.

SUMMARY OF THE INVENTION

According to one embodiment, a method of forming a cladding portion of an optical fiber preform assembly includes positioning a glass core cane in a mold cavity of a mold body. Silica glass soot may be loaded into the mold cavity such that the glass core cane is surrounded by silica glass soot. The silica glass soot in the mold cavity may be compressed in an axial direction such that a soot compact is fanned around the glass core cane. The soot compact may be a cladding portion of the optical fiber preform assembly and the glass core cane is a core portion of the optical fiber preform assembly.

In another embodiment, loading the mold with silica glass soot comprises loading a first portion of silica glass soot into the mold cavity around the glass core cane. The first portion of silica glass soot may then be compressed. A second portion of silica glass soot can then be loaded into the mold cavity and compressed on top of the first portion of silica glass soot. Thereafter, the process may be repeated for additional portions of silica glass soot until the desired amount of silica glass soot is loaded into the mold. The first portion of silica glass soot and the second portion of silica glass soot may be compressed in an axial direction while the vibratory energy is applied to the mold body such that a soot compact is formed around the glass core cane. The soot compact may be an initial cladding portion of the optical fiber preform assembly and the glass core cane is a core portion of the optical fiber preform assembly.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 6:
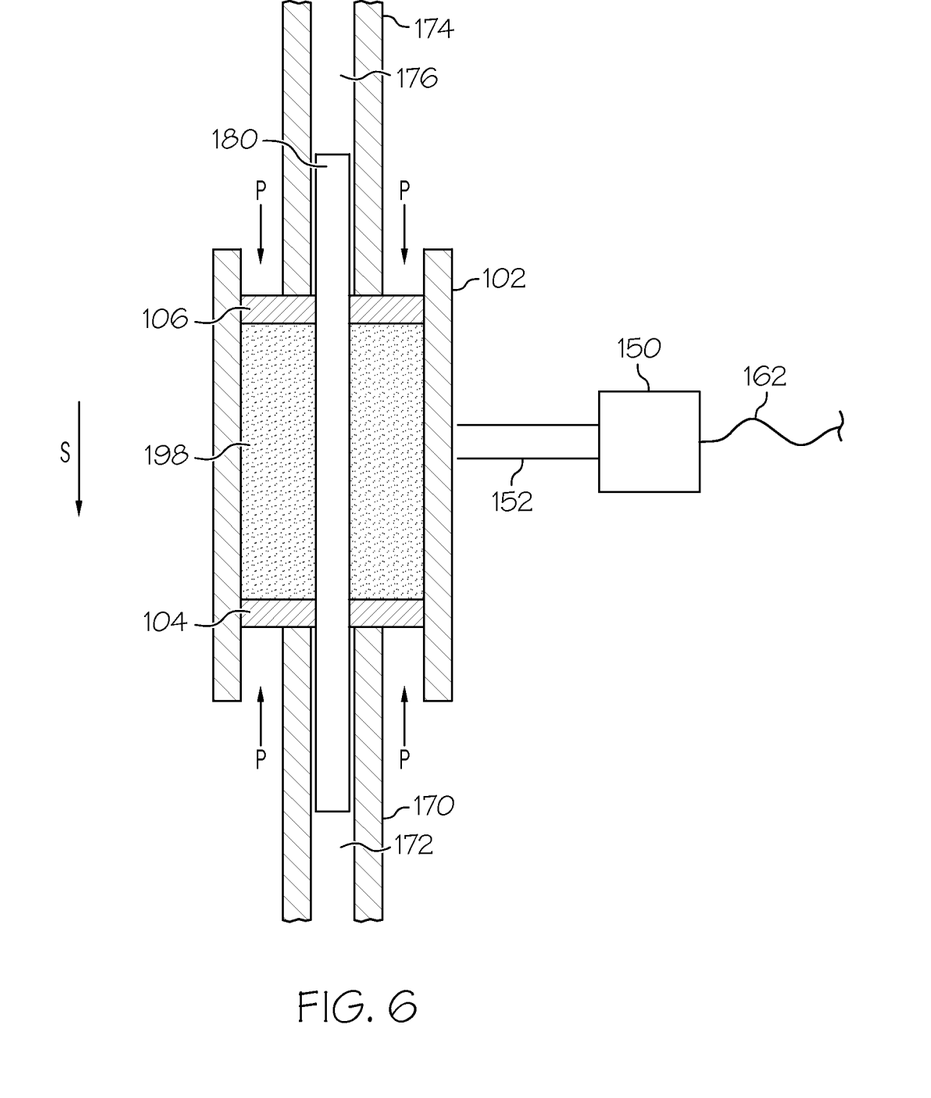
FIG. 6 depicts a cross section of a mold assembly and ultrasonic source being used to form a soot compact around a glass core cane according to one or more embodiments shown and described herein.

Reference will now be made in detail to the various exemplary embodiment(s), examples of which are illustrated in the accompanying drawings. Whenever possible, the same reference numerals will be used throughout the drawings and description to refer to the same or like parts. One embodiment of the method of forming optical fiber preforms is depicted in FIG. 6. In the embodiment illustrated, a glass core cane is positioned in a cylindrical mold and silica glass soot is loaded into the mold. Vibratory energy and pressure are applied to the silica glass soot to compress the silica glass soot and form a densified soot compact surrounding the glass core cane. The soot compact forms a cladding portion of an optical fiber preform assembly while the glass core cane forms the core portion of the optical fiber preform assembly. Thereafter, the optical fiber preform assembly may be consolidated to form an optical fiber preform. Methods of forming optical fiber preform assemblies and the apparatus used to form optical fiber preform assemblies will be described in more detail herein.

Figure 1:
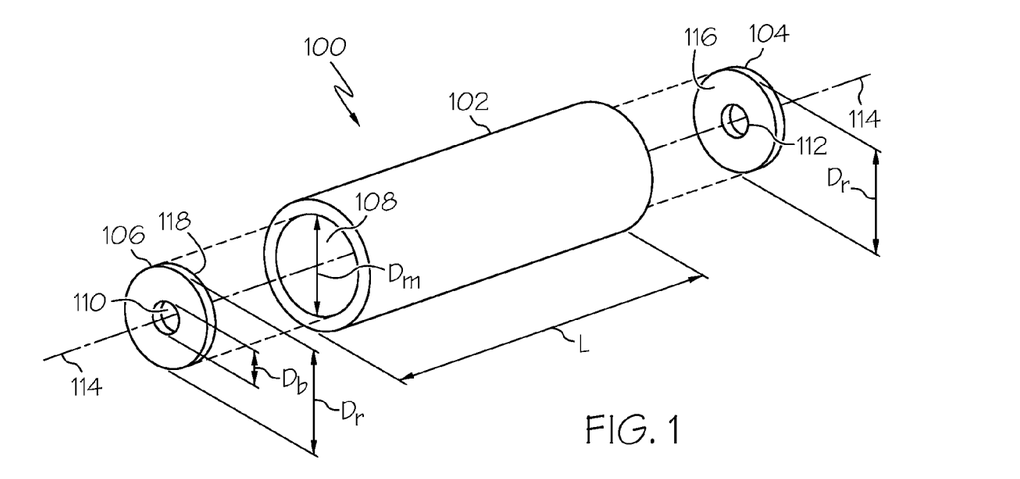
FIG. 1 depicts mold assembly for forming optical fiber preforms according to one or more embodiments shown and described herein.

Referring to FIG. 1, a mold assembly 100 for forming an optical fiber preform assembly generally comprises a mold body 102, a lower ram 104 and an upper ram 106. The mold body 102 defines a mold cavity 108 centered on and extending along the long axis 114 of the mold body 102. The mold cavity 108 may be cylindrical with a diameter $D_m$ and a length L. The mold body 102 may comprise a rigid, inelastic material such as carbon, aluminum, steel, silicon aluminum oxynitride, silicon carbide or other, similar mechanically durable materials. In one embodiment, the mold body 102 may be formed as a single piece, as shown in FIG. 1.

Figure 2:
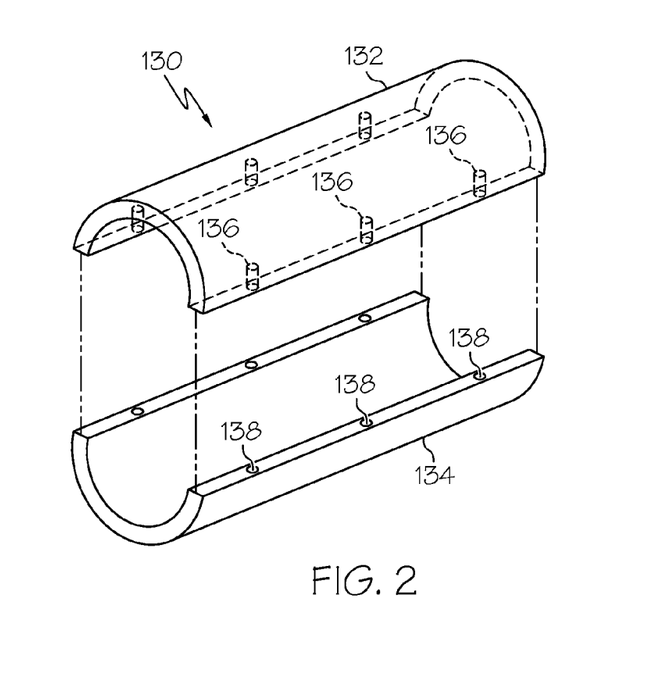
FIG. 2 depicts a segmented mold body for forming optical fiber preforms according to one or more embodiments shown and described herein.

Referring now to FIG. 2, another embodiment of a mold body is shown. In this embodiment, the mold body is a segmented mold body 130 formed from a plurality of mold segments 132, 134 extending along an axial direction. In the embodiment shown, the mold segments 132, 134 may be fastened together by inserting fasteners through fastener holes 136 positioned along the edge of the mold segment 132 and into corresponding threaded holes 138 positioned along the edge of mold segment 134. However, it should be understood that the mold segments may be joined together using a variety of other fasteners and/or fastening techniques. For example, mold segment 132 may be coupled to mold segment 134 using one or more bands (not shown) which extend around the circumference of the assembled segments thereby securing mold segment 132 to mold segment 134.

Still referring to FIG. 2, the segmented mold body 130 may be lined with a material (not shown) such that the interior surface of the segmented mold body 130 is substantially continuous. In one embodiment, the lining material may comprise a low-friction polymeric material such as polytetrafluoroethylene (PTFE) or a similar material. In another embodiment, the lining material may comprise non-polymeric low friction materials such as carbon sheet or similar materials. The lining material may comprise a sheet of lining material positioned against the wall of the mold cavity 108 or a coating applied to the mold cavity 108.

It should be understood that, while FIG. 2 depicts the segmented mold body 130 as comprising two mold segments 132, 134, the segmented mold body 130 may comprise three or more mold segments which, when joined together, generally define a cylindrical mold cavity.

The diameter $D_m$ of the mold cavity 108 and the length L of the mold cavity 108 are generally selected to arrive at the desired final dimensions of the fully consolidated optical fiber preform made according to the soot pressing method described herein. For experimental purposes (e.g., to form a laboratory scale optical fiber preform) mold cavities with diameters of 44 mm, 48 mm, and 89 mm and a length of 61 cm were used to form laboratory scale optical fiber preforms having outer diameters after consolidation from about 3.3 cm (using a 44 mm diameter mold cavity) to less than about 7 cm (using an 89 mm diameter mold cavity). However, it should be understood that dimensions of the mold body 102 and the mold cavity 108 may be upwardly scaled to produce larger optical fiber preforms for use in the commercial production of optical fiber. For example, to produce a larger, production ready optical fiber preform, the diameter of the mold cavity 108 of the mold body 102 may be on the order of 20 cm which may yield an optical fiber preform having an outer diameter on the order of 15 cm following consolidation. Further, the length of the mold cavity may be on the order of 2 m or greater. Criteria for selecting the diameter of the mold cavity to achieve the desired optical fiber preform dimensions will be discussed further herein.

Referring again to FIG. 1, the lower ram 104 and upper ram 106 are generally disc-shaped and have an outer diameter $D_r$. The outer diameter $D_r$ of the rams 104, 106 may be substantially the same as the diameter $D_m$ of the mold cavity 108 such that the rams 104, 106 may be positioned in the mold cavity 108 and slidably positioned relative to one another along the long axis 114 of the mold body 102. The rams 104, 106 may be made of metal, such as aluminum, steel, plastic or any other material having suitable durability. Each of the lower ram 104 and upper ram 106 may comprise a bore 112, 110, respectively, extending through the center of the ram such that, when the rams 104, 106 are positioned in the mold cavity 108, the bores 112, 110 are centered on the long axis 114 of the mold body 102. Each bore 112, 110 may have a diameter $D_b$ which generally corresponds to the diameter of a glass core cane used for making the optical fiber preform assembly, which will be described in further detail herein.

As shown in FIG. 1, the rams 104, 106 each comprise an interior surface 116, 118, respectively. The interior surfaces 116, 118 are opposed to one another when the rams 104, 106 are positioned in the mold cavity 108. In the embodiment shown in FIG. 1, the interior surfaces 116, 118 of the rams 104, 106 are generally planar. However, it should be understood that the interior surfaces 116, 118 of the rams 104, 106 may comprise other surface geometries. For example, the interior surfaces 116, 118 of the rams 104, 106 may be conically tapered or parabolically shaped in order to shape the end portions of the soot compact formed by compressing silica glass soot between the rams 104, 106 in the mold cavity 108 to improve the shape retention of the soot compact upon sintering. Moreover, the interior surfaces 116, 118 of the rams 104, 106 may have a parabolic geometry to optimize reflection and/or dissipation of vibratory energy introduced into the mold cavity 108 through the mold body 102.

Figure 3:
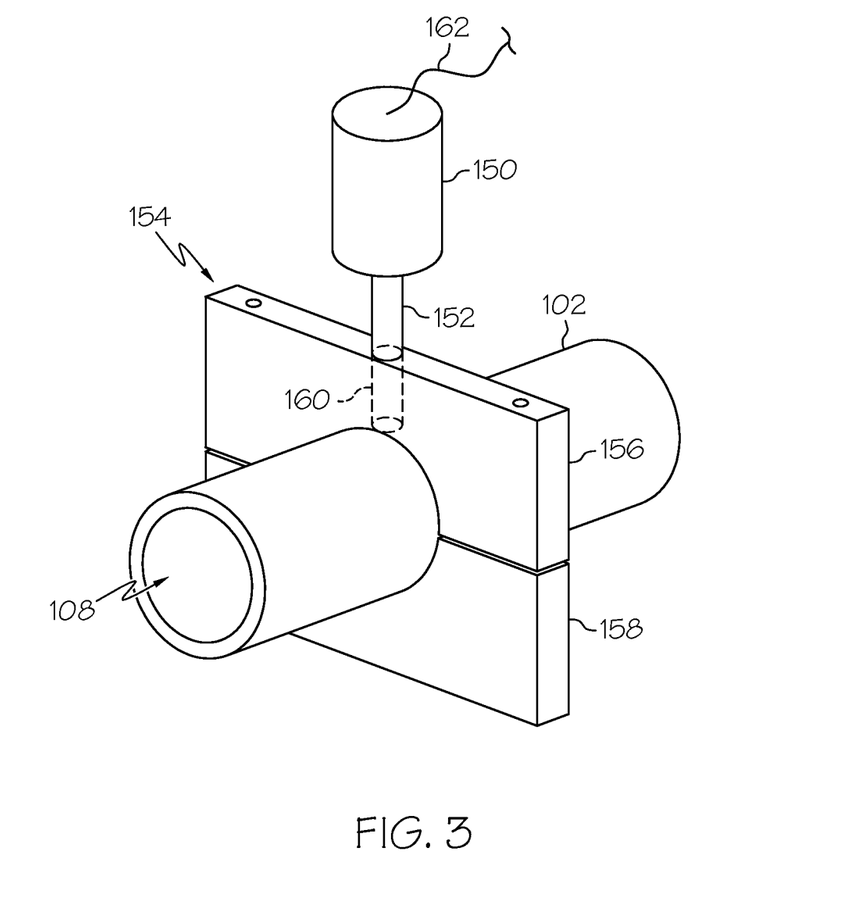
FIG. 3 depicts a mold assembly coupled to an ultrasonic source according to one or more embodiments shown and described herein.

Referring now to FIG. 3, a mold body 102 of the mold assembly 100 is shown coupled to an ultrasonic source 150. The ultrasonic source 150 may be used to apply vibratory energy to the mold body 102 which is, in turn, propagated into the mold cavity 108. The vibratory energy fluidizes silica glass soot loaded in the mold cavity 108 thereby reducing drag or friction between adjacent silica glass soot particles and friction between silica glass soot particles and the interior of the mold which, in turn, facilitates compressing silica glass soot to a greater and more uniform density along the length L of the mold than without the application of vibratory energy. The greater and more uniform density of soot compacts produced by applying vibratory energy during formation of the soot compact around the glass core cane produces an optical fiber preform assembly which, when consolidated into an optical fiber preform, has very little taper from the ends of the preform to the center of the preform (e.g., the density of the glass formed from the soot compact is substantially uniform along the axial length of the optical fiber preform). It should be understood that the phrase "optical fiber preform assembly," as used herein, refers to a glass core cane imbedded in a soot compact which, when consolidated, forms an optical fiber preform comprising a core portion (e.g., the glass core cane) and a glass cladding portion (e.g., the consolidated soot compact).

The ultrasonic source 150 is coupled to the mold body 102 with a waveguide 152 and mounting collar 154. In the embodiment shown, the mounting collar 154 comprises a first collar portion 156 and a corresponding second collar portion 158. The first collar portion 156 and the second collar portion 158 may be positioned around the mold body 102 and fastened together such that the mounting collar 154 is securely attached to the mold body 102. The first collar portion 156 may comprise a channel 160 extending through the first collar portion 156. The waveguide 152 may be positioned in the channel 160 such that the waveguide 152 is positioned proximate the mold body 102 but not in direct contact with the mold body 102. The ultrasonic source 150 is coupled to an end of the waveguide 152 opposite the mold body 102 such that vibratory energy generated by the ultrasonic source 150 may be propagated along the waveguide 152, into the mounting collar 154 and, thereafter, to the mold body 102.

The ultrasonic source 150 may be coupled to a control unit (not shown) via electrical cable 162. The control unit may comprise a signal generator and a 5 kW power amplifier. The signal generator may be operable to produce various low voltage (e.g., 5-10 volts) electronic waveforms which are amplified by the power amplifier before the control unit passes the electronic waveforms to the ultrasonic source 150 via the electrical cable 162. A transducer in the ultrasonic source 150 converts the electronic waveforms to vibratory energy which is propagated along the waveguide 152 to the mold body 102 thereby mechanically vibrating the mold body 102 and the contents of the mold cavity 108. The electronic waveforms generated by the signal generator and passed to the ultrasonic source 150 may take on a variety of forms including, without limitation, sinusoidal waveforms, square wave waveforms, sawtooth waveforms, triangular waveforms and the like. In one embodiment, the ultrasonic source 150 may receive electronic waveforms from the control unit and, based on the received electronic waveforms, generate high frequency vibrations having a frequency from about 15 kHz to about 50 kHz (e.g., a range of frequencies spanning from acoustic or audible frequencies to ultrasonic frequencies) and, more preferably, from about 17 kHz to about 25 kHz. In another embodiment, the ultrasonic source 150 may be operable to generate high frequency/low amplitude vibrations in the audible or acoustic range from about 1 kHz to about 15 kHz (e.g., outside the ultrasonic range) and, more preferably, from about 1 kHz to about 5 kHz. The intensity or amplitude of the vibratory energy generated by the ultrasonic source 150 may be controlled by adjusting the amplitude or intensity (e.g., the power) of the electronic waveforms generated by the control unit. In one embodiment, the control unit may be operable to generate electronic waveforms having multiple frequency modes and sweep such modes over a range of frequencies to avoid establishing a standing wave in the mold cavity. The control unit may also be operable to periodically vary the amplitude of the generated electronic waveforms. In another embodiment, the control unit may be operable to periodically apply a multimode frequency sweep to the generated electronic waveforms to avoid establishing a standing wave of vibratory energy in the mold cavity 108 which may inhibit compaction of silica glass soot loaded in the mold cavity. In one embodiment, the power of the power supply used to produce the electronic waveforms generated by the control unit may be from about 50% to about 60% of the 5 kW power supply while the frequency sweeping may be performed over a +/−30 Hz frequency range.

Figure 4:
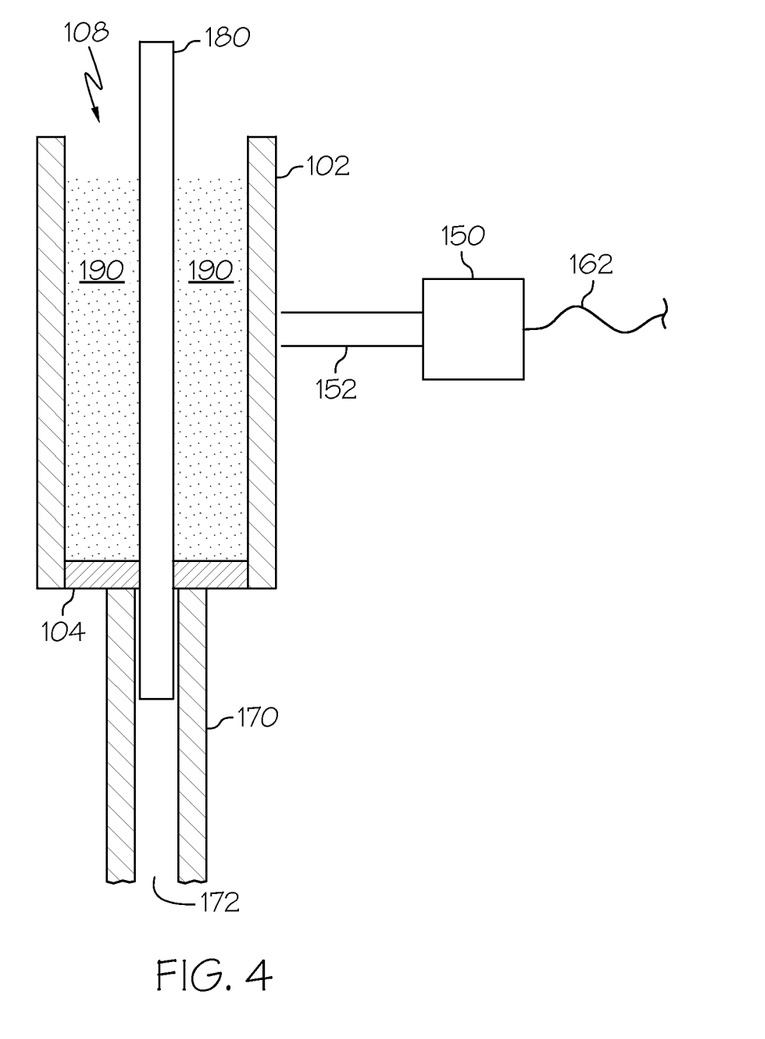
FIG. 4 depicts a cross section of a mold assembly and ultrasonic source loaded with uncompressed silica glass soot according to one or more embodiments shown and described herein.

Referring now to FIG. 4, a cross section of a mold body 102 is shown. In general, to form an optical fiber preform assembly, a glass core cane 180 is first positioned in the mold cavity 108 and silica glass soot 190 is loaded around the rod and compressed. The desired dimensions of the fully consolidated optical fiber preform govern the exact dimensions of the mold cavity and the final density of the soot compact created by the pressing operation. For typical laboratory scale optical fiber preforms, the desired core/clad ratio of the preform was 0.069 meaning that the core portion of the optical fiber preform is 6.9% of the preform diameter. Thus, starting with a glass core cane having a 19 mm diameter and a core/clad ratio of 0.23 (meaning the core diameter is 23% of the cane diameter or 4.18), the outside diameter of the fiber preform after consolidation should be about 61 mm to achieve the desired core/clad ratio of 0.069. Using the shrinkage rates for a given density of compacted silica glass soot, the size of the mold needed to achieve an optical fiber preform of the desired dimensions may be determined. For example, silica glass soot having a density of 0.81 g/cc has an axial shrinkage of 21% and a radial shrinkage of 32% after consolidation to glass. Accordingly, to achieve a consolidated optical fiber preform having an outer diameter of 61 mm, the diameter of the mold must be about 89 mm. Generally, to determine the necessary mold diameter to achieve a desired optical fiber preform geometry requires the following: the compacted soot density; experimentally derived values for axial; and radial shrinkage upon consolidation for a given soot density and the core/clad ratio of the glass core cane.

In order to form an optical fiber preform assembly comprising a glass core cane 180 surrounded by and coaxial with a soot compact cladding portion, a glass core cane 180 may be positioned in the mold cavity 108. More specifically, the glass core cane 180 is positioned in the bore of the lower ram 104 such that the glass core cane 180 is substantially centered on the long axis of the mold body 102. The glass core cane 180 may comprise a cylindrical silica glass-based core cane comprising at least a pure silica glass core or doped silica glass core. The glass core cane may also comprise additional glass layers surrounding the core, such as an inner cladding layer or the like, and such additional layers may include dopants such that the glass layers have an index of refraction different than that of the glass core.

As shown in FIG. 4, the glass core cane 180 may extend through the lower ram 104 and into a guide channel 172 of lower ram extension 170. The lower ram extension 170 and upper ram extension (shown in FIG. 6 and discussed further herein) transmit pressure from a press arm (not shown) of a press (not shown) to the rams 104, 106 thereby driving the rams 104, 106 towards one another along the axial direction of the mold body 102.

After the glass core cane 180 is positioned in the mold cavity 108, the mold cavity 108 is loaded with silica glass soot 190. The silica glass soot 190 may comprise commercially available silica glass soot or silica glass particles. Alternatively, the silica glass soot may be soot recovered from pyrolisis of a chemical vapor depositions operation, e.g., from deposition of octamethyltetrasiloxane during outside vapor deposition (OVD) of an overclad portion of an optical fiber of other silica-based optical fiber preforms (e.g., silica glass soot recycled from an optical fiber preform manufacturing operation). The soot may comprise dopants, such as dopants which increase or decrease the index of refraction of silica glass, or the soot may be substantially pure silica glass soot. In one embodiment, the silica glass soot loaded into the mold cavity does not contain any binders. In one embodiment, silica glass soot may have a surface area between about 250 $m^2/g$ to about 5 $m^2/g$, more preferably from about 100 $m^2/g$ to about 10 $m^2/g$ and, most preferably, 50 $m^2/g$ to 10 $m^2/g$. These ranges generally correspond to particle sizes of about 10 nm to about 500 nm, more preferably 30 nm to about 250 nm and most preferably 60 nm to about 250 nm, respectively. However, it should be understood that the soot pressing methods described herein may be used to compress silica glass soot generally having a particle size of less than about 10 microns.

The amount of silica glass soot 190 loaded into the mold cavity 108 is dependent on the diameter of the mold cavity 108, the desired length of the consolidated optical fiber preform, and the desired core/clad ratio for the consolidated optical fiber preform. Based on these considerations, the amount of silica glass soot 190 added to the cavity is selected such that the target soot density for a soot compact 198 used to form the cladding portion of an optical fiber preform may be from about 0.5 g/cc to about 1.2 g/cc, more preferably greater than about 0.7 g/cc and less than about 1.1 g/cc, and most preferably greater than about 0.8 g/cc and less than about 1.0 g/cc.

In one embodiment, as shown in FIG. 4, the silica glass soot 190 is loaded into the mold cavity 108 in a single step. In this embodiment, as the silica glass soot 190 is loaded into the mold cavity 108, the silica glass soot may be stirred with slack in the glass core cane 180 to evenly distribute the soot in the mold cavity 108. Additionally or alternatively, the mold body 102 may be tapped and/or vibrated with the ultrasonic source as the silica glass soot is loaded into the mold cavity 108 to encourage uniform packing of the silica glass soot in the mold cavity 108. For example, vibratory energy may be applied to the mold cavity with the ultrasonic source 150 thereby fluidizing the silica glass soot and reducing friction between adjacent silica glass soot particles and reducing friction between silica glass soot particles and the interior surfaces of the mold cavity. When the silica glass soot is fluidized by the application of vibratory energy, the density of the silica glass soot loaded in the cavity may be increased without the application of mechanical pressure. Furthermore, the application of vibratory energy promotes uniformity in the density of the silica glass soot over the length of the mold body 102. In one embodiment, when vibratory energy is applied to the mold body 102 as the silica glass soot is loaded into the mold cavity, the silica glass soot may reach a density of at least about 0.35 g/cc and, more preferably, greater than about 0.37 g/cc without mechanically pressing the silica glass soot.

In another embodiment, silica glass soot may be loaded into the mold cavity 108 as a vacuum is drawn on the mold. For example, in one embodiment, a vacuum system (not shown) may be coupled to the mold cavity 108 proximate the lower ram 104. This may be accomplished by positioning the mold body 102 in a vacuum base (not shown) operatively coupled to a vacuum system such that the mold cavity is fluidly coupled to the vacuum system. As silica glass soot is loaded in the mold cavity 108, the vacuum system is used to extract air (including moisture in the air) from the mold cavity 108 and silica glass soot which, in turn, increases the density of the silica glass soot prior to compaction. In another embodiment, such as when the mold body 102 is constructed of a porous material, a vacuum may be drawn outside the mold body 102 thereby drawing air and/or moisture through the mold body 102 as soot is loaded into the mold cavity 108. Vacuum assisted loading of silica soot may be performed in conjunction with the application of vibratory energy.

Figure 5A:
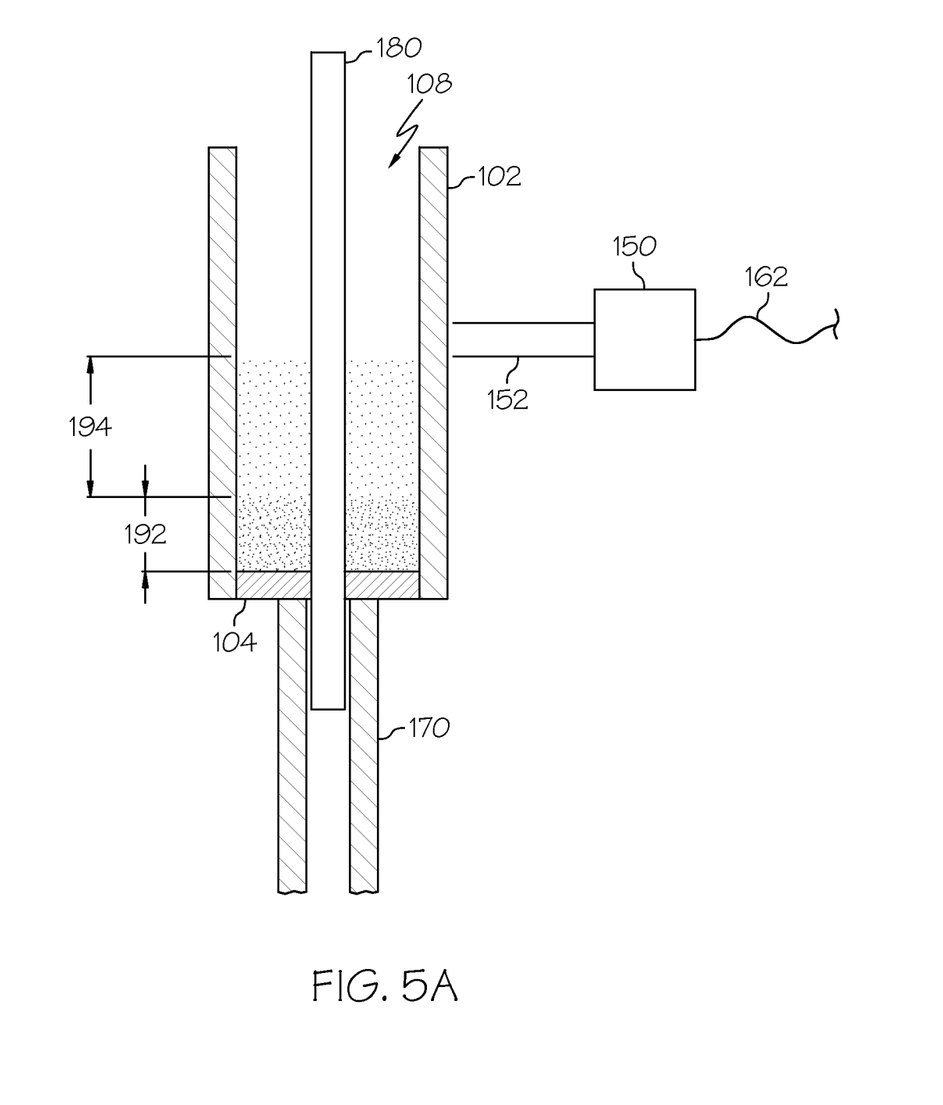
FIGS. 5A and 5B depict a cross section of a mold assembly and ultrasonic source being loaded with silica glass soot according to one or more embodiments shown and described herein.

Referring now to FIGS. 5A-B, in another embodiment, the silica glass soot is loaded into the mold cavity 108 in discrete portions and each portion of silica glass soot may be compressed before a subsequent portion of silica glass soot is added to the mold cavity 108 in order to improve uniformity in the density of the silica glass soot along the length of the mold body 102. For example, referring to FIG. 5A, the mold cavity 108 is shown loaded with two portions of silica glass soot 192, 194. The first portion of silica glass soot 192 has been compressed prior to the addition of the second portion 194 such that the first portion has a greater density than the second portion 194, as is graphically illustrated in FIG. 5A. The second portion of silica glass soot 194 may be compressed after being loaded into the mold cavity 108 on top of the first portion of silica glass soot 192.

In one embodiment, compressing each portion of silica glass soot loaded into the mold cavity may include manually compressing the silica glass soot. Manually compressing the silica glass soot may comprise using a tamp or similar instrument to apply pressure to the silica glass soot thereby compressing the silica glass soot. Manually compressing the silica glass soot may also comprise positioning the upper ram 106 in the mold cavity and manually applying pressure to the upper ram 106 with an extension, such as the upper ram extension (shown in FIG. 6), thereby compressing the silica glass soot.

In another embodiment, compressing each portion of silica glass soot may comprise positioning the upper ram 106 in the mold cavity 108 such that the upper ram 106 is disposed over the portion of silica glass soot to be compressed. Thereafter, mechanical pressure may be applied to the upper ram 106 with a press, such as a hydraulic press or mechanical press, thereby compressing the silica glass soot.

In order to maximize the density of each portion of silica glass soot, vibratory energy may be applied to the mold body 102 with the ultrasonic source 150 as each portion of silica glass soot is loaded into the mold cavity 108. Similarly, vibratory energy may also be applied to the mold body 102 as each portion of silica glass soot is compressed.

Figure 5B:
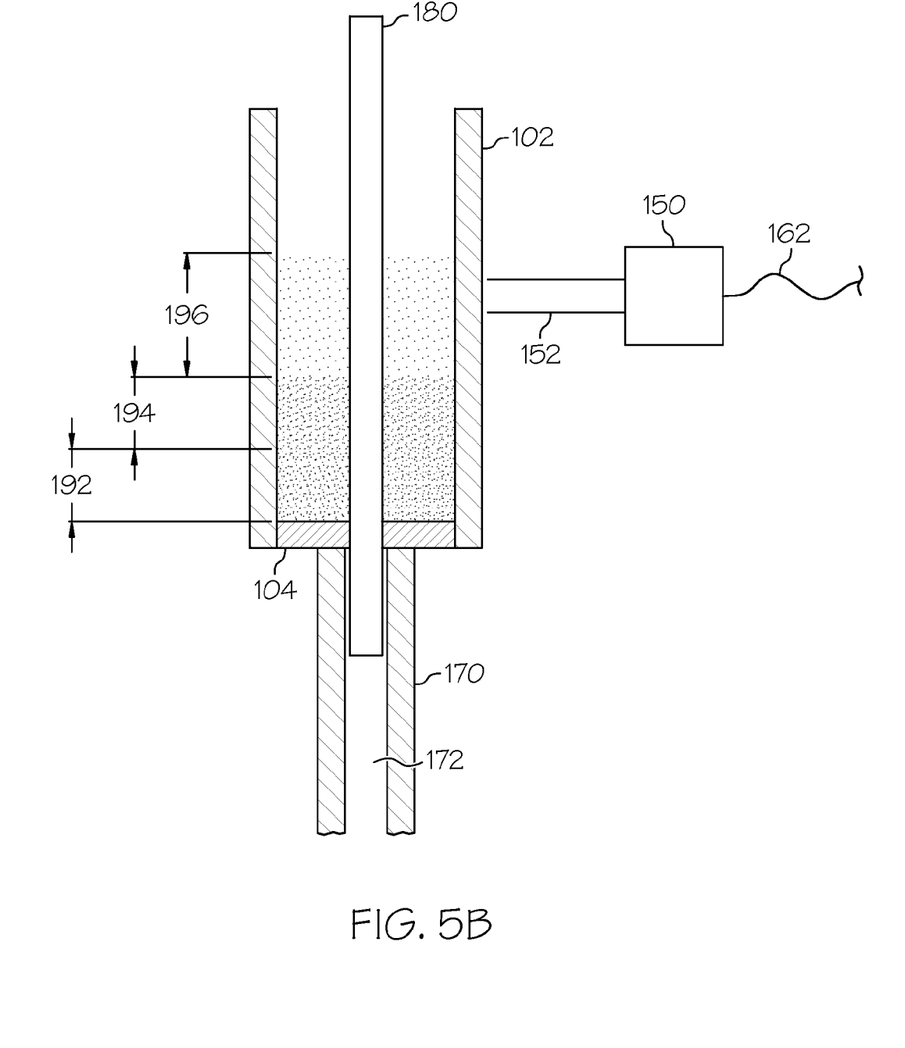

Referring to FIG. 5B, after the second portion of silica glass soot 194 has been compressed, as shown in FIG. 5B, a third portion (and optionally a fourth, fifth, and so on) of silica glass soot may be added to the mold cavity 108 directly adjacent to the second, compressed portion of silica glass soot 194. The third portion 196 may then be compressed and the loading/compressing process repeated until the desired amount of silica glass soot is loaded into the mold cavity 108.

Referring now to FIG. 6, after the mold cavity 108 is loaded with the desired amount of silica glass soot, the silica glass soot may be axially compressed to form a soot compact 198 around the glass core cane 180. To axially compress the silica glass soot, the upper ram 106 may be positioned in the mold cavity 108 such that the glass core cane 180 is inserted through the bore of the upper ram 106 and the upper ram 106 is in direct contact with the loaded silica glass soot. The mold assembly may then be positioned in a press and the upper ram extension 174, which may be coupled to the press arm (not shown) of the press, is positioned against the upper ram 106 such that the glass core cane 180 is disposed in the guide channel 176 of the upper ram extension 174, and guide channel 172 of lower ram extension 170. In one embodiment, the lower ram extension 170 may be positioned on a support plate (not shown) of the press. In another embodiment the lower ram extension may be positioned on a second press arm (not shown).

In one embodiment, after the mold assembly 100 is positioned in the press, the ultrasonic source 150 may be used to apply vibratory energy to the mold body 102 before axial pressure is applied to the rams 104, 106. The vibratory energy may be applied to the mold body throughout the pressing operation in order to increase the density of the compressed silica glass soot during the pressing operation and to improve uniformity in the density of the resulting soot compact. It has been found that, when vibratory energy is applied to the mold body 102 during the soot pressing process, less pressure is needed to achieve the same or greater densities of compacted soot than in soot pressing operations where no vibratory energy is applied to the mold body 102.

In another embodiment, when a segmented mold is used in conjunction with a low friction (relative to silica glass soot) lining material, it has been found that no vibratory energy need be applied to the mold body 102 during the soot compaction process to reach the same amount of compaction as achieved with a solid, unlined mold body. This is because the friction between the silica glass soot particles and the lining material is sufficiently low that the silica glass soot adjacent to the lining material of the mold cavity 108 is easily compressed (e.g., the silica glass soot does not drag on the mold wall) thereby reducing or eliminating the need for vibratory energy to cause the fluidization of the silica glass soot along the mold wall.

In yet another embodiment, a vacuum system may be used to purge the mold of air during the pressing operation thereby eliminating air in the soot compact and reducing the overall compression time needed to obtain a soot compact of the desired density.

With the mold assembly positioned in the press, pressure P is applied to the upper ram 106 and the lower ram 104 with the press via the ram extensions 170, 174 such that the silica glass soot is compressed between the rams 104, 106. In one embodiment, the press is used to apply pressure to the upper ram 106 thereby advancing the upper ram 106 toward the lower ram 104. The upper ram 106 may be advanced at a rate of about 0.1 mm/sec to about 10 mm/sec and, more preferably 0.1 mm/sec to about 2.0 mm/sec. During the pressing operation, the mold body 102 is supported and allowed to slide in the axial direction (indicated by arrow S in FIG. 6) at a rate of about ½ the rate at which the upper ram 106 is advanced so that both the top and the bottom rams move toward the middle of the mold. Allowing the mold body to slide maintains the symmetry of the compaction forces around the center of the soot compact 198 and, when vibratory energy is being applied, keeps the ultrasonic source positioned at the center portion of the soot compact 198 throughout the pressing operation.

In one embodiment, the axial position of each ram 104, 106 relative to the mold body 102 is monitored as the silica glass soot is compressed. Measuring the axial position of each ram 104 may be accomplished by placing a sensor (not shown), such as an ultrasonic sensor, a proximity sensor, an optical sensor, or the like, on a fixed point above and/or below the mold body 102 and using the sensor to measure the distance between the sensor and the ram as the ram is advanced along the axis of the mold body 102. In another embodiment, the axial position of the rams in the mold body 102 may be directly measured such as by Vernier calipers or similar measurement devices (not shown) operatively coupled to the rams and/or mold body 102. The use of sensors or measurement devices to detect the position of the rams in the mold cavity enables a real time calculation of the average density of the pressed silica glass soot based on the position of the rams in the mold cavity, the dimensions of the mold cavity, the dimensions of the rams, and the mass of silica glass soot placed in the mold cavity 108. The real time measurement of soot density may be used as a process control variable for the soot pressing process. More specifically, when the silica glass soot is compressed to a target density, as determined from the real time measurements, no additional mechanical pressure may be applied to the rams 104, 106.

In another embodiment, when the press is a hydraulically actuated press, the hydraulic line pressure of the hydraulic press is monitored and used to control the soot pressing process. The pressure in the hydraulic lines of the press is indicative of the resistance experienced by the hydraulic press arm as the silica glass soot is compressed. Accordingly, as the density of the soot increases through compression, the pressure in the hydraulic lines also increases. Thus, for given mold dimensions and mass of silica glass soot loaded into the mold cavity 108, the hydraulic line pressure may be indicative of the density of the soot during soot pressing process. Accordingly, the hydraulic line pressure may be used to determine when the compressed soot has reached a target density.

While either the real time measurement of soot density or the hydraulic line pressure may be used as a process control variable for the soot pressing process, it should be understood that both may be used in order to determine the density of the soot during the soot pressing process.

In another embodiment, a load cell may be attached to the lower ram 104 to measure the actual compaction force applied to the silica glass soot disposed in the mold cavity. Data derived from the load cell the axial displacement of the rams in the mold cavity, the mass of the suit, and the mold dimensions may be used to assure proper operation of the system and uniformity in the density of the resulting soot compact and, as such, may be used for quality control purposes.

As described hereinabove, the silica glass soot is pressed until a target soot density is reached for the resulting soot compact 198. The target soot density for a soot compact 198 used to form the cladding portion of an optical fiber preform may be from about 0.5 g/cc to about 1.2 g/cc, more preferably greater than about 0.7 g/cc and less than about 1.1 g/cc, and most preferably greater than about 0.8 g/cc and less than about 1.0 g/cc. In one embodiment, as the target soot density is approached, the application of vibratory energy is discontinued. For example, the application of vibratory energy may be discontinued when the calculated density of the soot compact is within 0.01 g/cc of the target density. Once the target density is reached, the pressure exerted on the rams at the target density is maintained as a static load for a predetermined relaxation time period to allow the soot compact to relax under the pressure. In one embodiment, the relaxation time period is from about 1 minute to about 10 minutes.

Figure 7:
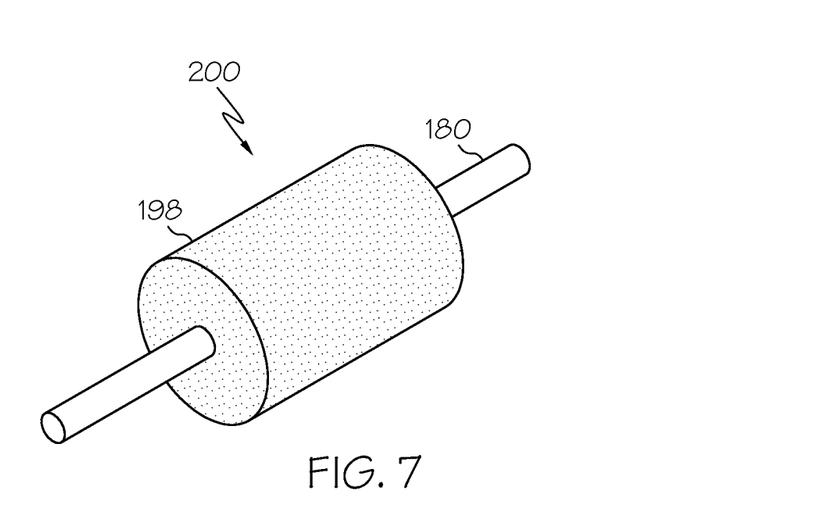
FIG. 7 depicts an optical fiber preform assembly comprising a soot compact formed around a glass core cane according to one or more embodiments shown and described herein.

Following the relaxation period, pressure on the soot compact 198 is released and the upper ram 106 and the lower ram 104 are removed from the mold cavity 108 leaving the soot compact 198 with embedded glass core cane 180 in the mold cavity 108. As shown in FIG. 7, the soot compact 198 and embedded glass core cane 180 form an optical fiber preform assembly 200 where the soot compact 198 forms a cladding portion of the optical fiber preform assembly 200 and the glass core cane 180 forms a core portion of the optical fiber preform assembly 200.

In order to further process the optical fiber preform assembly into an optical fiber preform, the optical fiber preform assembly 200 must be removed from the mold cavity 108. In one embodiment, to remove the optical fiber preform assembly from the mold cavity 108, the mold assembly is removed from the press and positioned on an extension rod such that the long axis of the mold body 102 is substantially vertical. Vibratory energy is then applied to the mold body 102 and the mold body is pressed off from the soot compact 198 leaving the optical fiber preform assembly positioned on the extension rod.

In another embodiment, when a segmented mold is used to form the soot compact 198, the individual segments of the mold body are removed from around the optical fiber preform assembly until the optical fiber preform assembly can be removed from the mold cavity 108. In this embodiment, after the optical fiber preform assembly is removed from the mold cavity 108, the cylindrical sleeve surrounding the soot compact 198 is removed from around the soot compact 198 so that the optical fiber preform assembly can be further processed.

In yet another embodiment, the optical fiber preform assembly may be removed from the mold cavity 108 by pre-sintering the soot compact 198 of the optical fiber preform assembly. Pre-sintering reduces the size of the soot compact such that the soot compact 198 may be easily removed from the mold cavity 108. Pre-sintering also increases the mechanical durability of the soot compact prior to consolidation. Pre-sintering the soot compact 198 may also include drying the soot compact. For example, to dry the soot compact 198, the mold with the soot compact may be loaded into a silica muffle in the hot zone of a tube furnace. The muffle is capped at both ends and a vacuum is pulled as the temperature of the furnace is increased to 300 C. The preform is held for 17 hours at 300 C under a vacuum of −26 inches of water. To pre-sinter the soot compact, the muffle is then back filled with helium to 1 atmosphere, evacuated and refilled with helium to 1 atmosphere an additional time. The temperature of the tube furnace is then ramped to 900 C and held for four hours under flowing helium. The tube furnace is then cooled. When the tube furnace reaches room temperature the helium flow is stopped and the mold is removed from the capped muffle. The pre-sintered soot compact may be removed from the mold as the diameter of the soot compact has decreased during pre-sintering. Variations in hold times and the use of additional ramps to temperatures of 400 C to 700 C before the 900 C pre-sinter may be desirable to maximize glass quality.

In another embodiment, the soot compact 198 is pre-sintered by placing the mold body 102 containing the optical fiber preform assembly in a tube furnace. The atmosphere of the furnace may be purged with helium and the temperature of the furnace may be increased to between about 800 C and 1200 C in an atmosphere of flowing helium. The furnace is held at the desired pre-sintering temperature for about 2 hours. The pre-sintered soot compact 198 may be readily removed from the mold body 102 upon cooling. For lower density compacts, or smaller diameter molds, it may be necessary or desirable to sinter the soot compact at temperatures greater than 1000 C. However, before reaching these temperatures, it may be necessary to dry the soot compact prior to sintering at these elevated temperatures to avoid the formation of undesirable cristobalite phases in the sintered silica glass. In one embodiment, to dry the soot compact, the furnace with mold and optical fiber preform assembly is heated to 1000 C in a flowing mixture of 5% chlorine in helium gas. The furnace is held at 1000 C for about 2 hours prior to increasing the temperature of the furnace to the pre-sintering temperature. Because the mold body 102 is exposed to chlorine vapor during the drying process, a material that is non-reactive with chlorine gas, such as carbon, should be used for the mold body 102 when it is expected that the soot compact 198 will be pre-sintered in the mold cavity 108 at temperatures over 1000 C.

Further, the pre-sintering process described hereinabove was used to process soot compacts formed from molds having inner diameters $D_m$ of 44 mm and 89 mm. It should be understood that the pre-sintering process may be scaled and optimized for soot compacts of different dimensions.

Figure 8:
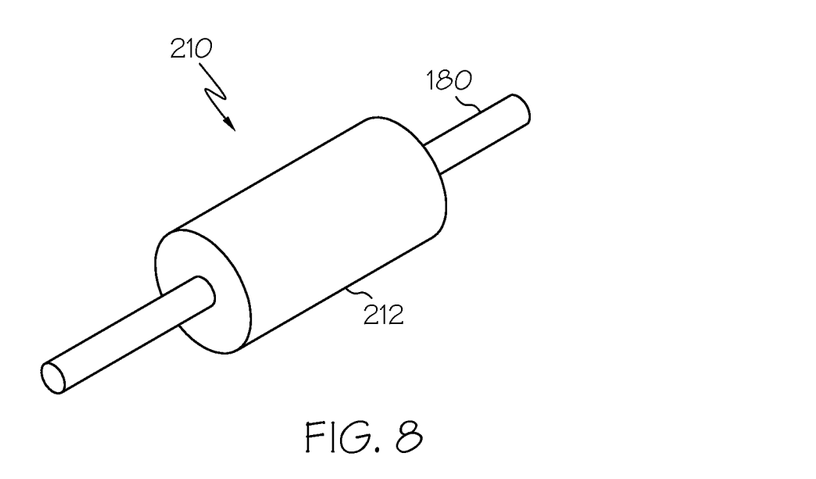
FIG. 8 depicts an optical fiber preform produced according to one or more embodiments shown and described herein.

Referring now to FIG. 7, the soot compaction process described herein yields an optical fiber preform assembly 200 comprising the soot compact 198, which forms a cladding portion of the optical fiber preform assembly 200, and the glass core cane 180, which forms the core portion of the optical fiber preform assembly 200. After the optical fiber preform assembly 200 is removed from the mold, the optical fiber preform assembly 200 may be consolidated to sinter the soot compact 198 thereby forming a dense silica glass cladding portion 212 around the glass core cane 180, as shown in FIG. 8. The consolidation of the soot compact 198 also joins the cladding portion 212 to the glass core cane 180 thereby forming an optical fiber preform 210.

In one embodiment, the optical fiber preform assembly 200 is consolidated to an optical fiber preform 210 by affixing a handle to the glass core cane 180 and hanging the optical fiber preform assembly from a quartz immersion rod over a consolidation furnace. The consolidation furnace may generally comprise a tube furnace with a quartz muffle having a drying zone and a consolidation zone. The drying zone may be held at a temperature of about 1000 C while the consolidation zone has a temperature gradient from about 1000 C to about 1450 C across the zone. The consolidation zone of the consolidation furnace may be maintained under a helium flow. The optical fiber preform assembly is held in the drying zone of the consolidation furnace and successively exposed to a flow of helium and oxygen and a flow of helium and chlorine in two isothermal hold periods in order to dry the optical fiber preform assembly and remove carbon, water and transition metal impurities. After the drying treatment, the atmosphere in the tube furnace is then switched to a helium flow and the optical fiber preform assembly is lowered through the consolidation zone to increase the temperature of the silica glass soot creating a vitreous flow of glass sufficient to form fully consolidated glass. Following consolidation, the consolidated optical fiber preform assembly (now optical fiber preform) is withdrawn from the consolidation furnace and loaded into a 1000 C holding oven for at least six hours to de-gas and anneal the sample.

While the soot pressing process described herein may be optimized to improve uniformity in the density of the soot compact and thereby reduce geometrical variations in the consolidated optical fiber preform, the optical fiber preform formed by the soot pressing process may have some dimensional variation following consolidation. For example, the diameter of the cladding portion 212 of the optical fiber preform may be greater at the ends of the consolidated optical fiber preform than in the middle of the optical fiber preform such that the diameter of the optical fiber preform tapers from the ends to the middle. In one embodiment, the optical fiber preform may be machined after pre-sintering to eliminate any dimensional variations along the axial length of the optical fiber preform. For example, the optical fiber preform may be positioned in a lathe and machined to selectively reduce the diameter of certain portions of the cladding along the axial length of the optical fiber preform thereby forming an optical fiber preform with a uniform diameter.

EXAMPLES

The invention will be further clarified by the following examples.

Example 1

In this example, two optical fiber preform assemblies were prepared by loading the mold cavity with silica glass soot in a single step. To form the optical fiber preform assemblies, a glass core cane 1.9 cm in diameter was positioned in a carbon mold having a mold cavity 89 mm in diameter and a length of 610 mm. The mold cavity was lined with a vitreous carbon coating. The length of the glass core cane in this example was the same as the length of the mold.

The glass core cane was positioned in the mold cavity by inserting an end of the glass core cane in the bore of a ram positioned in the lower portion of the mold cavity. 933 g of silica glass soot were added to the mold cavity such that the glass core cane was centered in the silica glass soot. Vibratory energy was applied to the mold body after the silica glass soot was loaded into the mold cavity in order to maximize the pre-compression density of the silica glass soot. The top ram was positioned on the glass core cane and inserted in the mold cavity. Ram extensions were inserted into the mold cavity around the glass core cane and the mold and extensions were positioned in a hydraulic press. The press arm of the hydraulic press was fitted to the upper ram extension while the lower ram extension was positioned on a support plate of the hydraulic press. Vibratory energy was applied to the mold at a frequency of 19.86 kHz at 51% of the power of the 5 kW amplifier. A multimode frequency sweep of 40 Hz with a 0.026 s period was applied to the vibratory energy to avoid establishing standing waves in the mold cavity.

Figure 9:
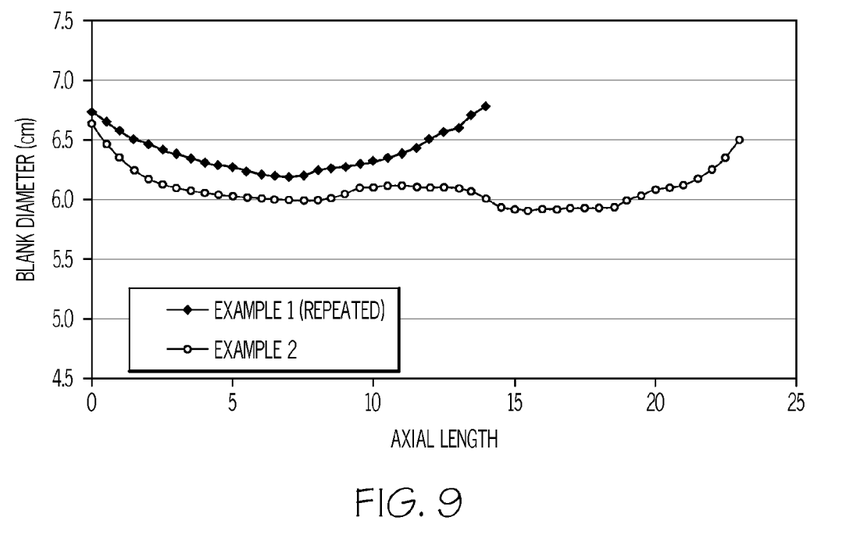
FIG. 9 depicts density profiles for the optical fiber preforms of examples 1 and 2.

To compress the soot, the top ram of the press was advanced toward the bottom ram at a rate of 4.8 mm/sec. The mold was allowed to slide relative to the soot compact at a rate of about 2.4 mm/sec thereby keeping the ultrasonic source centered on the suit compact. The density of the suit was calculated in real time throughout the pressing operation based on the measured position of the top ram in the mold cavity, the dimensions of the mold, and the mass of the soot. As the calculated density of the soot was within 0.01 g/cc of the target density (0.8 g/cc in this example), the vibratory energy was discontinued. When the calculated density of the soot reached the target density of 0.8 g/cc, the motion of the press arm of the hydraulic press was discontinued such that only a static load of 209 lbs. remained in the hydraulic line of the press. After a period of 10 minutes, the static load was released. Thereafter, the optical fiber preform assemblies were positioned in a tube furnace and dried in a flow of helium with 5% chlorine for 1 hour at 1000 C. The optical fiber preform assemblies were then pre-sintered at 1200 C for 1 hour and then consolidated, as described hereinabove. The variation in the diameter of the consolidated optical fiber preform is shown in FIG. 9. The diameter variation of the samples was less than about +10% of the minimum diameter of the consolidated optical fiber preform.

Example 2

In this example, an optical fiber preform assembly was prepared by loading silica glass soot in the mold cavity in discrete portions and pressing each portion before adding a subsequent portion. To form the optical fiber preform assemblies, a glass core cane 1.9 cm in diameter was positioned in a carbon mold having a mold cavity 89 mm in diameter and a length of 610 mm. The mold cavity was lined with a vitreous carbon coating. The length of the glass core cane in this example was the same as the length of the mold. The glass core cane was positioned in the mold cavity by inserting an end of the glass core cane in the bore of a ram positioned in the lower portion of the mold cavity.

A total of 1375 g of silica glass soot was loaded into the mold in the following manner: a first portion of 275 g of silica glass soot was loaded into the mold cavity and manually pressed to a density of 0.55 g/cc as vibratory energy was applied to the mold body. The vibratory energy applied to the mold during the loading phase had a frequency of 19.86 kHz at 61% of the power of the 5 kW amplifier. A multimode frequency sweep of 40 Hz with a 0.026 s period was applied to the vibratory energy to avoid establishing standing waves in the mold cavity. A second portion of 275 g of silica glass soot was loaded into the mold cavity and manually pressed to a density of 0.47 g/cc as vibratory energy was applied to the mold body. A third portion of 275 g of silica glass soot was loaded into the mold cavity and manually pressed to a density of 0.4 g/cc as vibratory energy was applied to the mold body. The first, second and third portions of silica glass soot were then manually pushed to the opposite end of the mold body using a ram extension as vibratory energy was applied to the mold body. Thereafter, a fourth portion of 275 g of silica glass soot was then loaded into the mold cavity such that the fourth portion of silica glass soot was directly adjacent the first portion of silica glass soot. The fourth portion of silica glass soot was then manually pressed to a density of 0.47 g/cc as vibratory energy was applied to the mold body. A fifth portion of 275 g of silica glass soot was then loaded into the mold cavity directly adjacent the fourth portion and manually pressed to a density of 0.4 g/cc as vibratory energy was applied to the mold body. The loaded soot was thus positioned in the mold cavity such that the first portion was disposed between the second and third portions on one side and the fourth and fifth portions on the other.

Thereafter, the rams were positioned on the glass core cane and inserted in the mold cavity. Ram extensions were inserted into the mold cavity around the glass core cane and the mold and extensions were positioned in a hydraulic press. The press arm of the hydraulic press was fitted to the upper ram extension while the lower ram extension was positioned on a support plate of the hydraulic press. Vibratory energy was applied to the mold at a frequency of 19.86 kHz at 61% of the power of the 5 kW amplifier. A multimode frequency sweep of 40 Hz with a 0.026 s period was applied to the vibratory energy to avoid establishing standing waves in the mold cavity.

To compress the soot, the top ram of the press was advanced toward the bottom ram at a rate of 1.6 mm/sec. The mold was allowed to slide relative to the soot compact at a rate of about 0.8 mm/sec thereby keeping the ultrasonic source centered on the suit compact. The density of the suit was calculated in real time throughout the pressing operation based on the measured position of the top ram in the mold cavity, the dimensions of the mold, and the mass of the soot. As the calculated density of the soot was within 0.01 g/cc of the target density (0.8 g/cc in this example), the vibratory energy was discontinued. When the calculated density of the soot reached the target density of 0.8 g/cc, the motion of the press arm of the hydraulic press was discontinued such that only a static load of 1317 lbs. remained in the hydraulic line of the press. After a period of 10 minutes, the static load was released. Thereafter, the optical fiber preform assemblies were positioned in a tube furnace and dried in a flow of helium with 5% chlorine for 1 hour at 1000 C. The optical fiber preform assemblies were then pre-sintered at 1200 C for 1 hour and then consolidated, as described hereinabove. The variation in the diameter of the consolidated optical fiber preform is shown in FIG. 9. The diameter of this sample varied by about +/−5% across the axial length with the greatest variation occurring at the ends.

Example 3

In this example an optical fiber preform assembly is formed from a segmented mold without the application of vibratory energy. A segmented aluminum mold was used having a mold cavity 50 mm in diameter and a length of 306 mm. The segmented mold comprised three axial segments with each segment forming a 120 degree portion of the mold body. The mold was lined with a 1 mm thick PTFE sheet extending around the circumference of the mold cavity. Accordingly, the diameter of the mold cavity with the PTFE lining was 48 mm. The bottom ram was positioned in the mold and a 1.9 cm diameter and 306 mm long silica glass core cane was positioned in the mold. 190 grams of silica glass soot was loaded into the mold. The mold was tapped and stirred with slack in the glass core cane to homogenize the density of the soot in the mold. Manual pressure was applied to the soot to pack the soot to a density of about 0.6 g/cc. This density was attainable without mechanical compaction due to the PTFE lining. After the silica glass soot was loaded, the top ram was positioned on the glass core cane and inserted into the mold cavity. Extensions were placed on the rams and the assembled mold was positioned in a hydraulic press.

The soot was compressed by advancing the top ram into the mold cavity with the hydraulic arm at a rate of about 2 mm/sec. The mold was allowed to slide relative to the soot compact at a rate of about 1.0 mm/sec thereby keeping the compressive forces centered on the soot compact. The soot was compacted to a target density of 0.81 g/cc utilizing the real time displacement of the top ram to determine when the target density was reached. Once the target density was reached, the advancement of the ram into the mold cavity was halted leaving a static load of 854 lbs. in the hydraulic line of the press. The sample was allowed to relax under the static load for a period of 10 minutes. Thereafter, the applied load was removed and the rams were taken out of the mold cavity.

To de-mold the optical fiber preform assembly, bolts joining the mold segments together were loosed and one mold segment was removed. The optical fiber preform assembly could then be removed from the mold by sliding the optical fiber preform assembly and PTFE lining out of the mold cavity. The PTFE lining was then removed from the optical fiber preform assembly.

The optical fiber preform assembly was then pre-sintered in a tube furnace by placing the optical fiber preform in the tube furnace and heating the furnace to a temperature of 900 C. The furnace was held at 400 C for 4 hours. After pre-sintering the blank was consolidated as described hereinabove.

Figure 10:
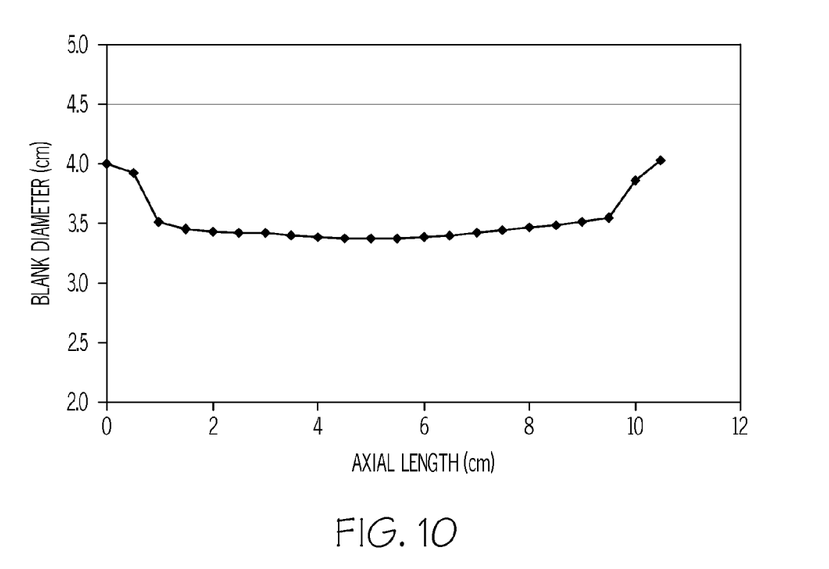
FIG. 10 depicts density profiles for the optical fiber preform discussed of example 3.

A density profile for the optical fiber preform of example 3 is shown in FIG. 10. The diameter of the consolidated optical fiber preform varies by less than 6% exclusive of the ends of the preform (e.g. approximately 1 cm away from either end of the preform) and varies by about 19% over the entire length of the preform.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of forming a cladding portion of an optical fiber preform assembly, the method comprising:
    positioning a glass core cane in a mold cavity of a rigid mold body;
    loading the mold cavity with silica glass soot;
    compressing the silica glass soot in an axial direction and during said compressing step, as the silica glass soot is compressed forming a soot compact having a density of at least 0.5 g/cc around the glass core cane, wherein the soot compact is the cladding portion of the optical fiber preform assembly and the glass core cane is a core portion of the optical fiber preform assembly;
    applying vibratory energy to the mold body as the silica glass soot is compressed to cause the fluidization of the silica glass soot along a mold wall of the mold cavity;
    pre-sintering the optical fiber preform assembly;
    subsequent to said pre-sintering step but prior to fully consolidating and sintering the optical fiber preform assembly, machining said optical fiber preform assembly to selectively remove portions of the cladding; and
    subsequent to said machining step, fully consolidating the optical fiber preform assembly such that the consolidated optical fiber preform assembly has diameter variations that are less than +10% of the minimum diameter of the consolidated optical fiber preform assembly.

2. The method of claim 1 wherein the vibratory energy comprises multiple frequency modes and the multiple frequency modes are swept over a range of frequencies.

3. A method of forming a cladding portion of an optical fiber preform assembly, the method comprising:
    positioning a glass core cane in a mold cavity of a rigid mold body;
    loading the mold cavity with silica glass soot;
    compressing the silica glass soot in an axial direction and during said compressing step, as the silica glass soot is compressed forming a soot compact having a density of at least 0.5 g/cc around the glass core cane, wherein the soot compact is the cladding portion of the optical fiber preform assembly and the glass core cane is a core portion of the optical fiber preform assembly;
    applying vibratory energy to the mold body as the silica glass soot is compressed to cause the fluidization of the silica glass soot along a mold wall of the mold cavity, wherein the vibratory energy comprises multiple frequency modes and the multiple frequency modes are swept over a range of frequencies;
    fully consolidating the preform assembly such that the consolidated optical fiber preform assembly has diameter variations that are less than +10% of the minimum diameter of the consolidated optical fiber preform assembly.

4. The method of claim 3 wherein said loading step comprises loading silica soot having a particle size between about 10 nm and 500 nm.

5. The method of claim 3 further comprising applying vibratory energy to the mold body as the silica glass soot is loaded into the mold cavity.

6. The method of claim 3 wherein a vacuum is drawn on the mold cavity when the silica glass soot is loaded into the mold cavity.

7. The method of claim 6 further comprising applying vibratory energy to the mold body as the silica glass soot is loaded into the mold cavity.

8. The method of claim 3 further comprising drawing a vacuum on the mold cavity as the silica glass soot is compressed.

9. The method of claim 3 wherein the silica glass soot is loaded by: loading the mold cavity with a first portion of silica glass soot; compacting the first portion of silica glass soot; loading the mold cavity with a second portion of silica glass soot; and compacting the second portion of silica glass soot to at least 0.5 g/cc around the glass core cane.

10. The method of claim 9 further comprising applying vibratory energy to the mold body as the first portion of silica glass soot and the second portion of silica glass soot are loaded into the mold cavity.

11. The method of claim 9 wherein a compacted density of the first portion of silica glass soot is different than a compacted density of the second portion of silica glass soot.

12. The method of claim 3 further comprising:
pre-sintering the soot compact at a temperature between 900° and 1200° C.; and machining the soot compact to selectively remove portions of the cladding after pre-sintering step but prior to fully consolidating and sintering the preform.

13. The method of claim 12 wherein the soot compact is pre-sintered by: positioning the mold body with the soot compact in a silica muffle in a hot zone of a tube furnace; heating the tube furnace to about 900° C.; and holding the tube furnace at about 900° C. for about 4 hours under flowing helium.

14. The method of claim 13 further comprising:
evacuating the silica muffle; heating the tube furnace to about 300° C. before the tube furnace is heated to 900° C.; and holding the tube furnace at about 300° C. for about 17 hours.

15. The method of claim 3 wherein the soot compact is pre-sintered while the optical fiber preform assembly is positioned in the mold cavity.

16. The method of claim 3 further comprising removing the optical fiber preform assembly from the mold cavity by pressing the mold body from the optical fiber preform assembly.

17. The method of claim 16 further comprising applying vibratory energy to the mold body as the mold body is pressed from the optical fiber preform assembly.

18. The method of claim 3 wherein:
the mold body is a segmented mold body comprising at least two mold segments extending in an axial direction; and
the method further comprises removing the optical fiber preform assembly from the mold cavity by disassembling the segmented mold body.

19. The method of claim 18 wherein the mold cavity of the segmented mold body comprises a lining material.

20. The method of claim 3, wherein the mold cavity comprises a lining material, and wherein the lining material is a polymeric material.

21. The method of claim 3, further comprising pre-sintering the soot compact at a temperature between 900° and 1200° C.

22. The method of claim 3, wherein said loading step comprises loading silica glass soot which comprises a particle size less than 500 nm, and wherein said compressing step comprises compressing the silica glass soot to form a soot compact having a density of less than about 1.2 g/cc around the glass core cane.

23. The method of claim 3, wherein said positioning a glass core cane step comprises positioning said glass core cane in said mold cavity, an inner surface of the mold cavity comprising at least one material selected from the group consisting of carbon sheet and vitreous carbon.

* * * * *